United States Patent
Lee et al.

(10) Patent No.: US 12,044,487 B2
(45) Date of Patent: Jul. 23, 2024

(54) PLATE-TYPE HEAT EXCHANGER AND A METHOD FOR MANUFACTURING SAME

(71) Applicant: LG ELECTRONICS INC., Seoul (KR)

(72) Inventors: Eungyul Lee, Seoul (KR); Juhyok Kim, Seoul (KR); Jiwon Choi, Seoul (KR); Sanghoon Yoo, Seoul (KR); Hanchoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 674 days.

(21) Appl. No.: 16/979,768

(22) PCT Filed: Mar. 27, 2019

(86) PCT No.: PCT/KR2019/003595
§ 371 (c)(1),
(2) Date: Sep. 10, 2020

(87) PCT Pub. No.: WO2019/190207
PCT Pub. Date: Oct. 3, 2019

(65) Prior Publication Data
US 2021/0018277 A1  Jan. 21, 2021

(30) Foreign Application Priority Data

Mar. 27, 2018 (KR) .......... 10-2018-0035159
Aug. 27, 2018 (KR) .......... 10-2018-0100267

(51) Int. Cl.
*F28F 3/10* (2006.01)
*C08J 5/12* (2006.01)
(Continued)

(52) U.S. Cl.
CPC .................. *F28F 3/10* (2013.01);
*C08J 5/12* (2013.01); *C09J 1/00* (2013.01);
*C09J 1/02* (2013.01);
(Continued)

(58) Field of Classification Search
CPC .... F28D 9/005; F28D 9/0043; F28F 2275/02; F28F 2275/025; F28F 3/10; F28F 3/046;
(Continued)

(56) References Cited

U.S. PATENT DOCUMENTS 2,800,414 A * 7/1957 Stradley ............... C03C 8/08
501/24
5,931,219 A * 8/1999 Kull ................. F28D 9/005
165/166

(Continued)

FOREIGN PATENT DOCUMENTS

EP     0742418 A2 * 11/1996 ............ F28D 9/005
JP     60-101491           6/1985
(Continued)

OTHER PUBLICATIONS

International Search Report dated Jul. 23, 2019 issued in Application No. PCT/KR2019/003595.

*Primary Examiner* — Tho V Duong
*Assistant Examiner* — For K Ling
(74) *Attorney, Agent, or Firm* — KED & ASSOCIATES

(57) ABSTRACT

A plate-type heat exchanger and a method for manufacturing same are provided. A plate-type heat exchanger includes a first plate and a second plate which have flange parts vertically adhered by an adhesive, respectively. The flange parts are formed in a stepped shape and may thus increase an area adhered to the first plate and the second plate.

18 Claims, 12 Drawing Sheets

(51) Int. Cl.
  *C09J 1/00* (2006.01)
  *C09J 1/02* (2006.01)
  *C09J 5/06* (2006.01)
  *F28D 9/00* (2006.01)
  *F28F 3/04* (2006.01)

(52) U.S. Cl.
  CPC ............... *C09J 5/06* (2013.01); *F28D 9/005* (2013.01); *F28F 3/046* (2013.01); *F28F 2275/025* (2013.01)

(58) Field of Classification Search
  CPC ..... F28F 3/005; F28F 3/00; C03C 8/08; C09J 1/00; C09J 1/02
  See application file for complete search history.

(56) References Cited

U.S. PATENT DOCUMENTS

| | | | | |
|---|---|---|---|---|
| 6,355,586 | B1* | 3/2002 | Usui | C03C 8/24 501/15 |
| 6,566,289 | B2* | 5/2003 | Aronica | C03C 8/20 501/24 |
| 6,921,584 | B2* | 7/2005 | Syslak | C22C 21/02 165/905 |
| 7,204,297 | B2* | 4/2007 | Rehberg | F28F 3/08 165/70 |
| 7,426,957 | B2* | 9/2008 | Hendrix | F28D 9/005 165/166 |
| 9,846,000 | B2* | 12/2017 | Meguriya | F28F 3/08 |
| 2003/0102107 | A1 | 6/2003 | Nilsson et al. | |
| 2004/0237303 | A1* | 12/2004 | Maude | B01J 19/249 29/890 |
| 2005/0178536 | A1* | 8/2005 | Blomgren | B21D 53/04 165/167 |
| 2017/0107354 | A1 | 4/2017 | Yamabe et al. | |

FOREIGN PATENT DOCUMENTS

| | | | | |
|---|---|---|---|---|
| JP | 61-101286 | | 6/1986 | |
| JP | 06265289 A | * | 9/1994 | ............... F28D 9/00 |
| JP | H09-292194 | | 11/1997 | |
| JP | 2004-502921 | | 1/2004 | |
| JP | 2015-117170 | | 6/2015 | |
| JP | 2015117170 A | * | 6/2015 | ............... C03C 8/08 |
| JP | 2015-152285 | | 8/2015 | |
| JP | 2017-512872 | | 5/2017 | |
| KR | 10-2011-0106495 | | 9/2011 | |
| KR | 10-2015-0030235 | | 3/2015 | |
| KR | 10-2018-0006122 | | 1/2018 | |

* cited by examiner

PLATE-TYPE HEAT EXCHANGER AND A METHOD FOR MANUFACTURING SAME

CROSS-REFERENCE TO RELATED PATENT APPLICATIONS

This application is a U.S. National Stage Application under 35 U.S.C. § 371 of PCT Application No. PCT/KR2019/003595, filed Mar. 27, 2019, which claims priority to Korean Patent Application Nos. 10-2018-0035159, filed Mar. 27, 2018 and 10-2018-0100267, filed Aug. 27, 2018, whose entire disclosures are hereby incorporated by reference.

TECHNICAL FIELD

The present disclosure relates to a plate type heat exchanger and a method for manufacturing the same.

BACKGROUND ART

A heat exchanger, which is a device to guide heat exchange between at least two fluids, may include, for example, a plate type heat exchanger. The plate type heat exchanger may include at least two flow passages through which fluids making different temperatures flow, and the at least two flow passages may be alternately disposed.

The plate type heat exchanger has an advantage of representing higher heat exchange efficiency, and of being realized in smaller size and lighter weight, when comparing with other heat exchangers.

In association with such a plate type heat exchanger, the following related art is introduced.
1. Korean Unexamined Patent Application No. (Published date): 10-2008-0006122 (Jan. 16, 2008).
2. The title of the invention: Plate type heat exchanger and method for manufacturing the same.

The related art has following problems.

First, a conventional plate type heat exchanger is manufactured through a process of stacking a plurality of heat exchange plates and metals for brazing, and then performing brazing welding for the stacked structure, which has disadvantages of higher manufacturing cost and lower production efficiency.

Second, when the fluid flows through the plate type heat exchanger, foreign matters contained in the fluid may stick to the brazing-welded portion to cause contaminants in the heat exchange plate. Accordingly, the plate type heat exchanger may be corroded, and heat exchange performance may be deteriorated.

DISCLOSURE

Technical Problem

The present disclosure has been proposed to solve such a problem, and the present disclosure is to provide a plate type heat exchanger capable of lowering manufacturing costs by combining heat exchange plates using an adhesive agent.

In addition, the present disclosure is to provide a plate type heat exchanger capable of increasing an adhesive area (or an adhesive length) of a plate to prevent a decrease in adhesive force resulting from an adhesive agent. In particular, the present disclosure is to increase the contact area between stacked plates by bending a flange part of a plate and forming an adhesive part in the bent part.

In addition, the present disclosure is to provide a plate type heat exchanger capable of increasing supporting force between stacked plates by forming a step on a flange part of a first plate and supporting a second plate to the step.

In addition, the present disclosure is to provide a plate type heat exchanger, capable of improving adhesive strength by forming an adhesive agent using glass composition, and a method for manufacturing the same.

Further, the present disclosure is to provide a plate type heat exchanger, capable of preventing foreign matters, which are contained in a fluid, from being accumulated on a heat exchange plate, by using a hydrophilic property of a glass composition, even if the fluid flows through the plate type heat exchanger, and a method for manufacturing the same.

Technical Solution

To solve the problem occurring in the prior art, according to an embodiment of the present disclosure, a plate type heat exchanger includes first and second plates having flange parts adhering to each other by an adhesive agent in a vertical direction, and the flange parts are stepped to increase the adhesive area of the first and second plates.

The adhesive layer formed by the adhesive agent may include first and third adhesive parts to extend in a horizontal direction, and a second adhesive part to extend in the vertical direction toward the third adhesive part from the first adhesive part.

The flange part includes a first wall bent from the plate body to extend in the vertical direction, and a second wall to extend in the horizontal direction toward an outside of the plate body from the first wall.

The flange part includes a third wall to extend in the vertical direction from the second wall, and a fourth wall to extend in the horizontal direction toward the outside of the plate body from the third wall.

The first adhesive part may be formed between the first wall of the first plate and the second wall of the second plate The second adhesive part may be formed between the first wall of the first plate and the third wall of the second plate The third adhesive part may be formed between the third wall of the first plate and the fourth wall of the second plate The flange part may be bent from the plate body fourth times and extend.

With respect to a flowing depth (D1) indicating a distance between the plate body of the first plate and the plate body of the second plate, a sum of adhesive lengths of the first, second, and third adhesive parts may be greater than the flowing depth (D1).

A bending angle ($\theta$) between the plate body and the first wall may be 90° or more and 96° or less.

The bending angle ($\theta$) between the plate body and the first wall may be 90°.

The bending angle ($\theta$) between the plate body and the first wall may be more than 90° and 96° or less.

A thickness (t1) of a plate body may be formed in a range of 0.3 mm to 1.0 mm, and the flowing depth (D1) may be in a range of 1.0 mm to 2.0 mm.

The adhesive agent is interposed between a plurality of heat exchange plates, and includes glass frit including P2O5 and $TiO_2$ and a Group I-based oxide. Accordingly, the plurality of heat exchange plates may be simply coupled to each other by the adhesive agent.

The $P_2O_5$ may be contained in 20% to 30% by weight based on the whole glass frit, the $TiO_2$ is contained in 10% to 20% by weight based on the whole glass frit, and the Group I-based oxide is contained in 15% to 30% by weight based on the whole glass frit, thereby enhancing the stiffness of the plurality of heat exchange plates.

The glass frit may further include $SiO_2$ and may be contained in 10% to 20% by weight based on the whole glass frit.

The glass frit may further include $B_2O_3$, and the $B_2O_3$ may be contained in 5% to 15% by weight based on the whole glass frit.

The glass frit may further include Al2O3, and the Al2O3 may be contained in 10% to 30% by weight based on the whole glass frit.

The glass frit further may include a fluorine (F) compound, the fluorine (F) compound may include at least one metal oxide of NaF and $AlF_3$.

The fluorine (F) compound may be contained in 0.1% to 5% by weight based on the whole glass frit.

The glass frit may further include $ZrO_2$, and the $ZrO_2$ may be contained in 1% to 5% by weight based on the whole glass frit.

The glass frit may further include a Group II-oxide, and the Group II-oxide includes at least one metal oxide of CaO, MgO, and BaO.

The Group II-based oxide may be contained in 0.1% to 10% by weight based on the whole glass frit.

According to another aspect of the present disclosure, a plate type heat exchanger may include a first flat plane part to extend at opposite sides of an unevenness part and forming a flat surface, an inclination part to extend outward from the first flat panel part to be inclined, and a second flat plane part to extend outward from the inclination part and to define a flat surface.

The adhesive agent is provided on the unevenness part, the first flat panel part, and the inclination part such that the plurality of heat exchange plates are stably coupled to each other The adhesive agent may include a glass component to enhance adhesive force.

According to another embodiment of the present disclosure, a method for manufacturing a plate type heat exchanger includes performing spraying or dipping with respect to an adhesive agent including glass frit on a top surface of a first plate, manufacturing a plate assembly by stacking a second plate on the first plate, and heating the plate assembly to melt the adhesive agent, thereby manufacturing the plate type heat exchanger through a simple process.

Advantageous Effects

According to the present disclosure, the heat exchange plates are coupled to each other by the adhesive agent, thereby saving manufacturing costs and reduce the manufacturing time.

In addition, the flange part forming the edge part of the plate is bent to form a step, and the adhesive part is formed on the step, thereby increasing the adhesive area between the stacked plates. Accordingly, even if the plates are coupled to each other by using the adhesive agent, the adhesive force is prevented from being lowered.

In addition, the step may be formed such that upper and lower walls and left and right walls alternately extend, and the plate adjacent to the step may be supported. Accordingly, the supporting force may be increased in the vertical/horizontal direction.

In addition, since the stacked plates are firmly coupled to each other by using the step, the internal pressure having a specific level or more may be ensured without increasing the size of the plate.

In addition, even if the adhesive agent is applied to the whole area of the heat exchange plate, the contact part between two plates may adhere, thereby preventing the internal flow passage of the heat exchange plate from being blocked.

In addition, the adhesive agent is formed using the glass composition, thereby improving adhesive force and shear force. Accordingly, pressure resistance strength and breaking pressure may be increased to ensure the internal pressure of the plate type heat exchanger.

Further, foreign matters contained in a fluid may be prevented from being stacked on a heat exchange plate, by using a hydrophilic property of the glass composition, even if the fluid flows through the plate type heat exchanger. In other words, the glass composition or the heat exchange plate may be more cleaned.

In addition, even if the adhesive agent is applied to the whole area of the heat exchange plate, the contact part between two plates may adhere, thereby preventing the internal flow passage of the heat exchange plate from being blocked.

MODE FOR INVENTION

Hereinafter, the detailed embodiment of the present disclosure will be described with reference to accompanying drawings. However, the spirit of the present disclosure is not limited to suggested embodiments, and those skilled in the art, which understand the spirit of the present disclosure, may easily suggest another embodiment within the same technical scope.

Figure 1:
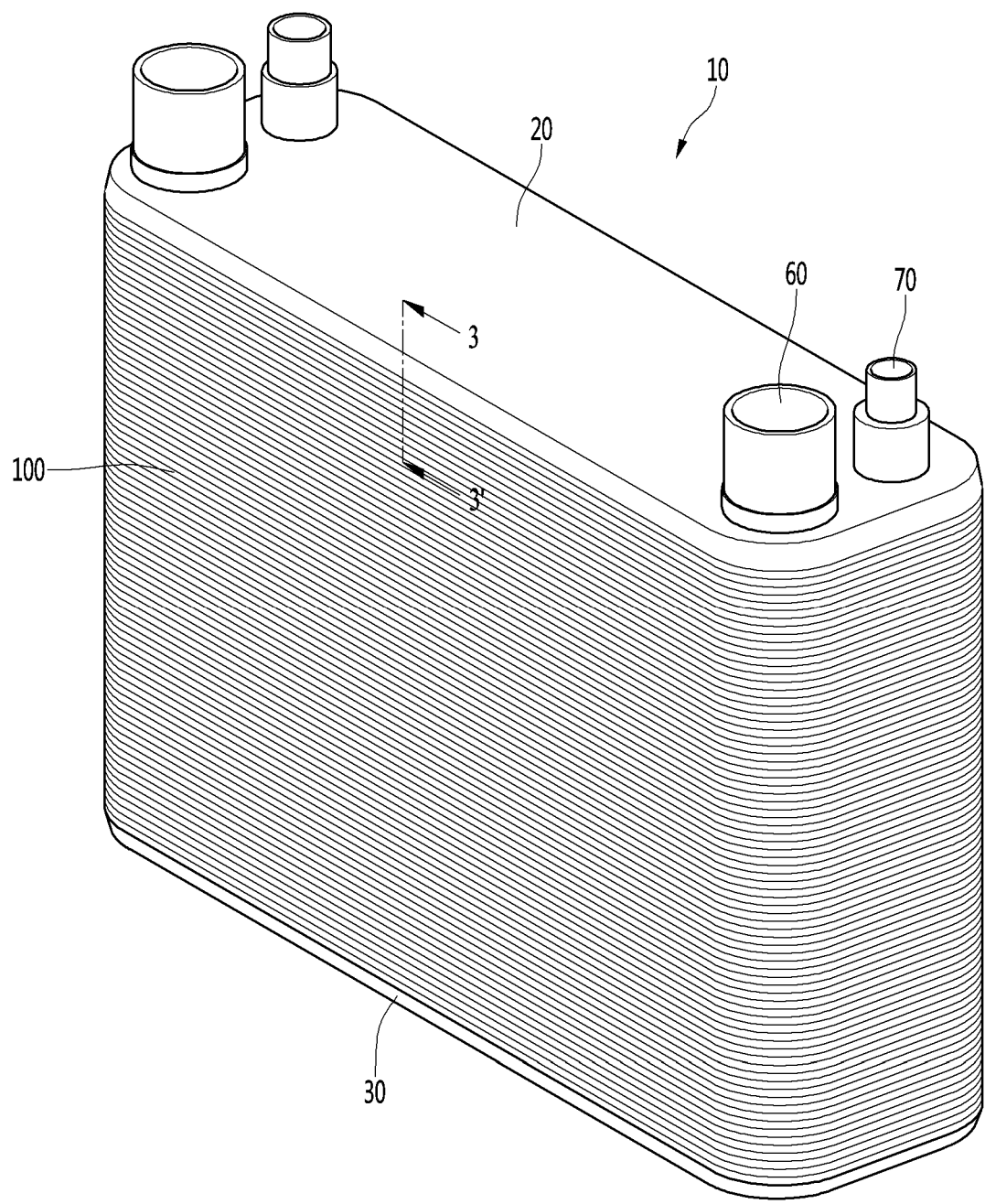
FIG. 1 is a perspective view illustrating the configuration of a plate type heat exchanger, according to an embodiment of the present disclosure.
Figure 2:
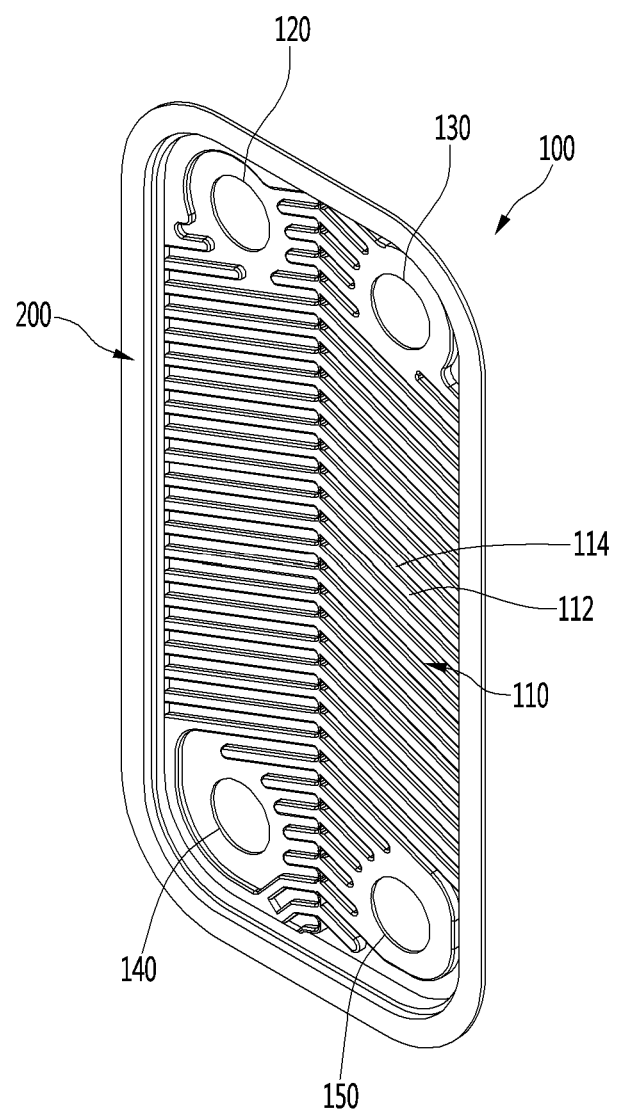
FIG. 2 is a view illustrating the configuration of a heat exchange plate constituting a plate type heat exchanger, according to a first embodiment of the present disclosure.

FIG. 1 is a perspective view illustrating the configuration of a plate type heat exchanger, according to an embodiment of the present disclosure, and FIG. 2 is a view illustrating the configuration of a heat exchange plate constituting a plate type heat exchanger, according to a first embodiment of the present disclosure.

First, referring to FIG. 1, a plate type heat exchanger 10 according to an embodiment of the present disclosure includes a plate package including a plurality of heat exchange plates 100 and end plates 20 and 30 provided at opposite sides of the plate package. For example, the heat exchange plate 100 and the two end plates 20 and 30 may have a quadrangular panel shape. In other words, the plate package may be interposed between the two end plates 20 and 30.

The heat exchange plate 100 may be formed of a metal material having excellent thermal conductivity and excellent pressure resistance against pressure. For example, the heat exchange plate 100 may be formed of a stainless material.

The plurality of heat exchange plates 100 are arranged to be stacked in the front-rear direction, and a flow passage, through which fluid flows, is interposed between the plurality of heat exchange plates 100. The flow passage includes a first flow passage through which a first fluid flows and a second flow passage through which a second fluid flows. The first and second flow passages may be sequentially arranged while alternating with each other.

The plate type heat exchanger 10 further includes a first inlet/outlet port 60 to allow the first fluid to be introduced into or discharged out of the plate package and a second inlet/outlet port 70 to allow the second fluid to be introduced into or discharged out of the plate package. The first inlet/outlet port 60 and the second inlet/outlet port 70 may be coupled to the end plate 20. The first and second fluids may be heat exchanged with each other with temperature differences therebetween. The first fluid may be a refrigerant, and the second fluid may be water.

Two first inlet/outlet ports 60 may be provided and may be disposed on an upper portion and a lower portion of the end plate 20, respectively. Two second inlet/outlet port 70 may be provided and may be disposed on an upper portion and a lower portion of the end plate 20, respectively.

For example, the two first inlet/outlet ports 60 may be disposed at the first and fourth corners, which are arranged in a diagonal direction, among the four corners of the end plate 20. For example, the two second inlet/outlet ports 70 may be disposed at the second and third corners, which are arranged in another diagonal direction, among the four corners of the end plate 20.

Next, referring to FIG. 2, the heat exchange plate 100 according to the embodiment of the present disclosure includes a plate body 110 having a quadrangular panel shape and a plurality of port openings 120, 130, 140, and 150 arranged at four corners of the plate body 110 and communicating the first and second inlet/outlet ports 60 and 70 to guide the flow of the fluid.

The plurality of port openings 120, 130, 140, and 150 include first and third port openings 120 and 140 formed at positions corresponding to the two first inlet/outlet ports 60. The first fluid flows to a rear portion of the heat exchange plate 100 from a front portion of the heat exchange plate 100 through the first port opening 120, and flows to the front portion of the heat exchange plate 100 from the rear portion of the heat exchange plate 100 through the third port opening 140.

The plurality of port openings 120, 130, 140, and 150 include second and fourth ports 130 and 150 formed at positions corresponding to the two second inlet/outlet ports 70. The second fluid flows to the rear portion of the heat exchange plate 100 from the front portion of the heat exchange plate 100 through the second port opening 130, and flows to the front portion of the heat exchange plate 100 from the rear portion of the heat exchange plate 100 through the fourth port opening 150.

The plate body 110 includes an unevenness part formed on the front surface thereof. In detail, the unevenness part includes a protrusion part 112 protruding forward from the front surface of the plate body 110, and a recess part 114 recessed rearward from the front surface of the plate body 110. A plurality of protrusion parts 112 and recess parts 114 are provided, and may be arranged while alternating with each other. In addition, the plate body 110 may include an unevenness part formed on the rear surface thereof.

For example, herringbone patterns may be formed on the front surface and the rear surface of the plate body 110 by the plurality of protrusion parts 112 and the plurality of recess parts 114.

The unevenness part of the plate body 110 may be provided to make contact with an unevenness part provided in another heat exchange plate 100 which is adjacent. In addition, the unevenness parts, which make contact with each other, may include adhesive parts adhering to each other by the adhesive agent. For example, the recess part 114 of the first plate 101 may adhere to the protrusion part 112 of the second plate 102 (see FIG. 3).

The heat exchange plate 100 includes a flange part 200 forming an edge of the plate body 110. The flange part 200 may be configured to be stepped to make contact with a flange part of the adjacent heat exchange plate 100. The contact part may be provided with an adhesive agent to make the two heat exchange plates 100 to adhere to each other.

Figure 3:
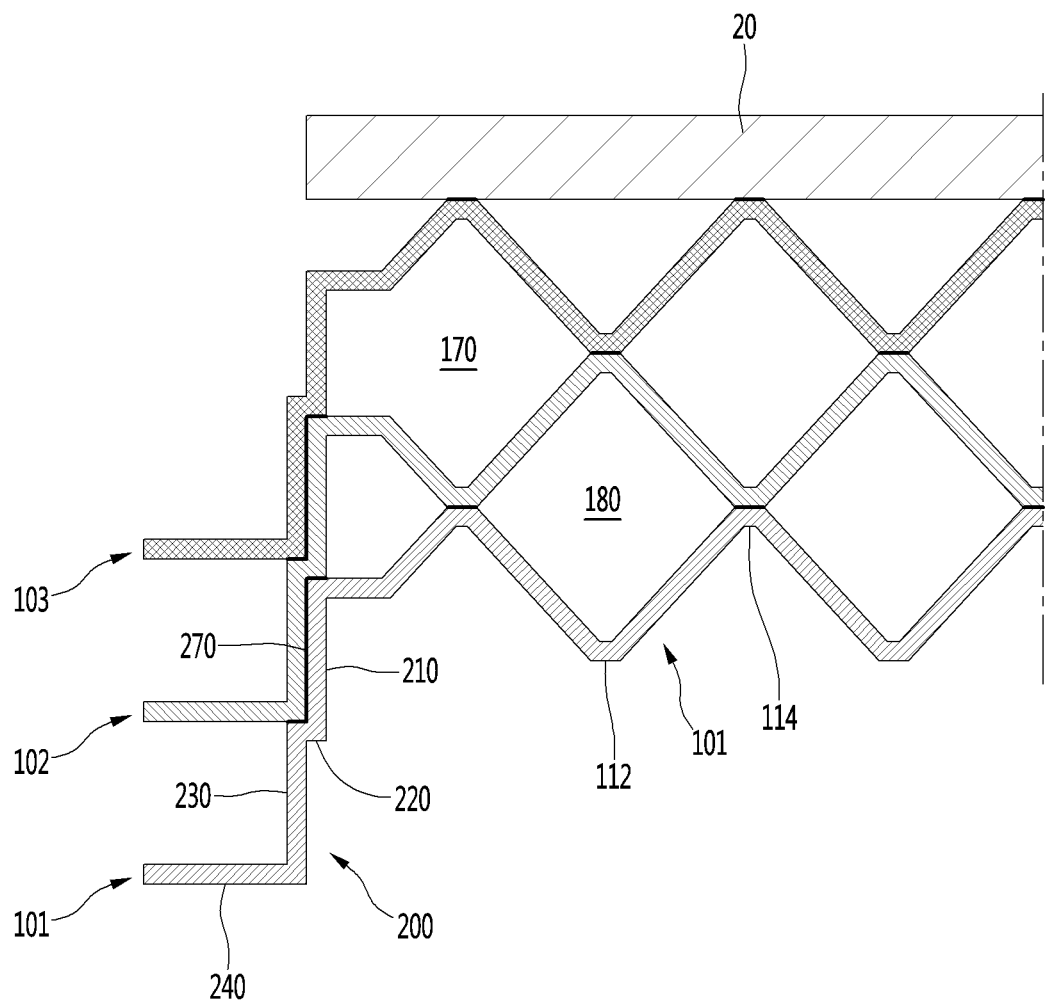
FIG. 3 is a cross-sectional view taken along line 3-3' of FIG. 1.
Figure 4:
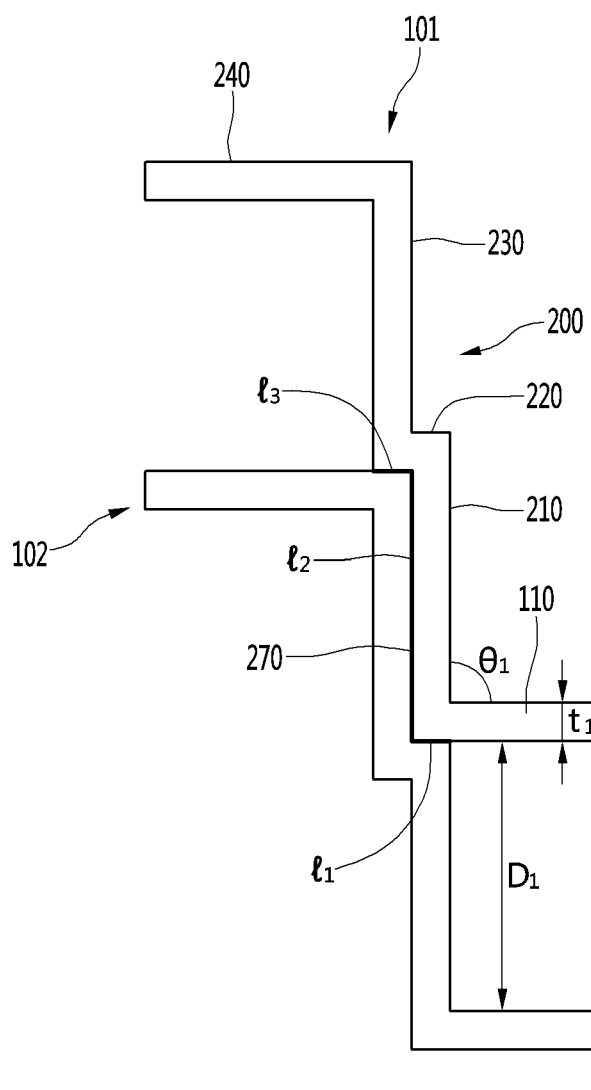
FIG. 4 is a view illustrating a partial configuration of the first and second plates stacked, according to a first embodiment of the present disclosure.

FIG. 3 is a cross-sectional view taken along line 3-3' of FIG. 1, and FIG. 4 is a view illustrating a partial configuration of the first and second plates stacked, according to a first embodiment of the present disclosure.

Referring to FIG. 3, according to the first embodiment of the present disclosure, the plate type heat exchanger 10 includes a plurality of heat exchange plates 101, 102, and 103 stacked in one direction. The plurality of heat exchange plates 101, 102, and 103 include the first plate 101, the second plate 102, and the third plate 103 adhering to each other by the adhesive agent.

The second plate 102 may be interposed between the first plate 101 and the third plate 103. In addition, the third plate 103 may be coupled to the end plate 20.

The adhesive agent includes glass frit. In detail, the adhesive agent includes a glass composition (enamel composition) in the form of a paste, and may be dispensed or applied to the entire surface of the plate body 110. For example, the adhesive agent may be applied onto the plate body 110 through spraying or dipping in a liquid form having a predetermined viscosity.

In addition, a debinding process is performed with respect to the plate body 110 having the adhesive agent to remove a binder from the adhesive agent. The debinding process may be understood as a process of vaporizing the binder by exposing the plate body 110 including the adhesive agent to an environment having a preset temperature.

Hereinafter, the components of the adhesive agent will be described in more detail. The adhesive agent may be prepared by mixing a glass composition, glass powder including a binder, and a solvent. The glass composition may include glass frit including $P_2O_5$ and $TiO_2$ and a Group I-based oxide.

The $P_2O_5$ is contained in 20% to 30% by weight based on the whole glass frit. In detail, the $P_2O_5$ is contained in 20% to 30% by weight based on the whole glass frit. In more detail, the $P_2O_5$ is contained in about 22% to about 28% by weight based on the whole glass frit.

The $P_2O_5$ is contained in the glass composition to improve cleaning performance of the glass composition. When the $P_2O_5$ is contained in about less than 20% by weight based on the whole glass frit, the cleaning performance of the glass composition may be degraded. When the $P_2O_5$ is contained in about more than 20% by weight based on the whole glass frit, the thermal characteristic of the glass composition may be degraded, and the vitrification of the glass composition may be weakened.

The $TiO_2$ is contained in about 20% or less by weight based on the whole glass frit. In detail, the $TiO_2$ is contained in 10% to 20% by weight based on the whole glass frit. In more detail, the $TiO_2$ is contained in about 12% to about 18% by weight based on the whole glass frit. The $TiO_2$ improves the water resistance of the glass composition.

The Group I-based oxide may include at least one metal oxide of $Na_2O$, $K_2O$ and $Li_2O$. In detail, the Group I-based oxide may include $Na_2O$, $K_2O$ and $Li_2O$. In other words, the glass prit may include all $Na_2O$, $K_2O$, and $Li_2O$ The Group I-based oxide is contained in about 20% or less by weight based on the whole glass frit. In detail, the Group I-based oxide is contained in about 15% to about 30% by weight based on the whole glass frit. In more detail, the Group I-based oxide is contained in about 20% to about 25% by weight based on the whole glass frit.

For example, when the glass frit includes all $Na_2O$, $K_2O$, and $Li_2O$, and the contents of the $Na_2O$, $K_2O$, and $Li_2O$ are as follows.

The $Na_2O$ is contained in about 5% to about 10% by weight based on the whole glass frit. The $Na_2O$ is contained in about 6% to about 9% by weight based on the whole glass frit.

The $K_2O$ is contained in about 10% to about 20% by weight based on the whole glass frit. In detail, the $K_2O$ is contained in about 12% to about 18% by weight based on the whole glass frit.

The $Li_2O$ is contained in about 0.1% to about 10% to about 1.5% by weight based on the whole glass frit. In detail, the $Li_2O$ is contained in about 0.5% to about 1% by weight based on the whole glass frit.

The glass frit further includes $SiO_2$.

The $SiO_2$ may be contained in about 20% or less by weight based on the whole glass frit. The $SiO_2$ may be contained in about 10% to about 20% by weight based on the whole glass frit. The $SiO_2$ may be contained in about 12% to about 18% by weight based on the whole glass frit.

The $SiO_2$ may be contained in the glass composition to form a glass structure of the glass composition, improve the frame of the glass structure, and improve acid resistance of the glass frit.

When the $SiO_2$ is contained in less than about 10% by weight based on the whole glass frit, the glass structure of the glass composition may be lowered, thereby lowering the adhesive force of the adhesive agent. When the $SiO_2$ is contained in about more than 20% by weight based on the whole glass frit, the cleaning performance of the glass composition may be degraded.

The glass frit may further include $B_2O_3$.

The $B_2O_3$ is contained in about 15% or less by weight based on the whole glass frit. In detail, the $B_2O_3$ is contained in about 5% to about 15% by weight based on the whole glass frit. In more detail, the $B_2O_3$ is contained in about 7% to about 13% by weight based on the whole glass frit.

The $B_2O_3$ may perform a function of enlarging the vitrification area of the glass frit and appropriately adjusting the thermal expansion coefficient of the glass composition according to the embodiment.

When the $B_2O_3$ is contained in less than about 5% by weight based on the whole glass frit, the vitrification area is reduced to reduce the glass structure, thereby lowering the adhesive force of the adhesive. In addition, when the $B_2O_3$ is contained in more than about 15% by weight based on the whole glass frit, the cleaning performance of the glass frit may be degraded.

The glass frit may further include $Al_2O_3$.

The $Al_2O_3$ is contained in about 30% or less by weight based on the whole glass frit. In detail, the $Al_2O_3$ is contained in 10% to 30% by weight based on the whole glass frit. In more detail, the $Al_2O_3$ is contained in about 15% to about 25% by weight based on the whole glass frit.

The glass frit may further include $ZrO_2$.

The $ZrO_2$ is contained in about 5% or less by weight based on the whole glass frit. In detail, the $ZrO_2$ is contained in about 1% to about 5% by weight based on the whole glass frit. In more detail, the $ZrO_2$ is contained in about 2% to about 4% by weight based on the whole glass frit. The $ZrO_2$ may increase the chemical resistance and durability of the glass composition.

The $Al_2O_3$ and the $ZrO_2$ may improve the chemical durability of the glass frit. In particular, the $Al_2O_3$ and the $ZrO_2$ play a role of complementing the low chemical durability of the alkaline foam glass structure formed by $P_2O_5$, $Na_2O$, $K_2O$ and $LiO_2$ through structural stabilization.

The glass frit may further include a fluorine compound. The fluorine compound may be selected from NaF or $AlF_3$. In detail, the fluorine compound may include NaF and $AlF_3$. In other words, the glass frit may include both NaF and $AlF_3$.

The fluorine compound may perform a function of appropriately adjusting the surface tension of the adhesive agent formed by the glass composition. In addition, the vitrification area of the glass frit may be enlarged by the fluorine compound.

The fluorine compound is contained in about 5% or less by weight based on the whole glass frit. In detail, the fluorine compound is contained in about 0.1% to about 5% by weight based on the whole glass frit. The fluorine compound is contained in about 1% to about 4% by weight based on the whole glass frit.

When the fluorine compound is contained in less than about 0.1% by weight based on the whole glass frit, the vitrification area is reduced to reduce the glass structure, thereby lowering the adhesive force of the adhesive agent.

The glass frit may further include a Group II-oxide. The Group II-based oxide may be selected from CaO, BaO or MgO. In detail, the Group II-based oxide may include CaO, BaO, and MgO. In other words, the glass frit may include CaO, BaO and MgO.

The Group II-based oxide may be contained in an amount of about 10% or less by weight based on the whole glass frit. In detail, the Group II-based oxide may be contained in about 0.1% to about 10% by weight based on the whole glass frit. In more detail, the Group II-based oxide may be contained in about 3% to about 7% by weight based on the whole glass frit.

The Group II-based oxide may improve the durability of the glass composition.

When the Group II-based oxide is contained in less than about 0.1% by weight based on the whole glass frit, the chemical resistance and durability of the glass composition may be reduced. In addition, when the Group II-based oxide is contained in more than about 10% by weight based on the whole glass frit, the cleaning performance of the glass frit may be reduced.

In summary, the range of the weight % of the components constituting the glass composition is preferably as illustrated in following Table 1.

TABLE 1

| Composition (ingredient) | % by weight |
|---|---|
| $P_2O_5$ | 22 to 28 |
| $TiO_2$ | 12 to 18 |
| $SiO_2$ | 12 to 18 |
| $Al_2O_3$ | 15 to 25 |
| $Na_2O$ | 6.0 to 9.0 |
| $K_2O$ | 12 to 18 |
| $Li_2O$ | 0.5 to 1.0 |
| $B_2O_3$ | 7.0 to 13.0 |
| $ZrO_2$ | 2.0 to 4.0 |
| Fluorine compound (NaF or $AlF_3$) | 1.0 to 4.0 |
| Group II-based oxide (CaO or BaO or MgO) | 3.0 to 7.0 |

Each of the first to third plates 101, 102, and 103 includes the plate body 110 in which the protrusion part 112 and the recess part 114 are alternately disposed. The recess part 114 of the second plate 102 adheres to the protrusion part 112 of the third plate 103, and the protrusion part 112 of the second plate 102 adheres to the recess part 114 of the first plate 101.

A first space part 170 through which the first fluid flows is interposed between the second plate 102 and the third plate 103. The first space part 170 may include a plurality of space parts defined by the adhering unevenness parts of the second and third plates 102 and 103.

A second space part 180 through which the second fluid flows is interposed between the first plate 101 and the second plate 102. The second space part 180 may include a plurality of space parts defined by the adhering unevenness parts of the first and second plates 102 and 103.

Each of the first to third plates 101, 102, and 103 includes a flange part 200 that form an edge part of the plate body 110 and have a bent shape.

The flange part 200 includes a first wall 210 which is bent from the plate body 110. The first wall 210 may extend in a vertical direction from the plate body 110.

The flange part 200 includes a second wall 220 which is bent from the first wall 210. The second wall 220 may extend in the horizontal direction from the first wall 210 toward the outside of the plate body 110.

The flange part 200 includes a third wall 230 which is bent from the second wall 220. The third wall 230 may extend in the vertical direction from the second wall 220. In addition, the direction in which the third wall 230 extends may be parallel to the direction in which the first wall 210 extends.

The flange part 200 includes a fourth wall 240 which is bent from the third wall 230. The fourth wall 240 may extend in the horizontal direction from the third wall 230 toward the outside of the plate body 110. In addition, the direction in which the fourth wall 240 extends may be parallel to the direction in which the second wall 220 extends.

Through the above configuration, the flange part 200 has a wall bent at least four times from the plate body 110, so the flange part 200 may form a step to support an adjacent heat exchange plate.

The first wall 210 of the first plate 101 may be supported to or make contact with the second wall 220 of the second plate 102, and the third wall 230 of the first plate 101 may be supported to or make contact with the third wall 230 of the second plate 102. In addition, the third wall 230 of the second plate 102 may make contact with the first wall 210 of the first plate 101.

An adhesive layer 270 formed by an adhesive agent is interposed between the walls of the second plate 102 and the walls of the first plate 101. The walls of the second plate 102 and the walls of the first plate 101 may adhere to each other by the adhesive layer 270.

In detail, the second wall 220 of the second plate 102 may adhere to the first wall 210 of the first plate 101, and the third wall 230 of the second plate 102 may adhere to the first wall 210 of the first plate 101. In addition, the fourth wall 240 of the second plate 102 may make contact with the third wall 230 of the first plate 101.

Referring to FIG. 4, the adhesive part between the second wall 220 of the second plate 102 and the first wall 210 of the first plate 101 forms a first adhesive length ($\ell 1$). The adhesive part between the third wall 230 of the second plate 102 and the first wall 210 of the first plate 101 forms a second adhesive length ($\ell 2$). In addition, the adhesive part between the fourth wall 240 of the second plate 102 and the third wall 230 of the first plate 101 forms a third adhesive length ($\ell 3$).

The adhesive layer 270 between the walls of the first plate 101 and the walls of the second plate 102 has a bent shape, and forms the sum of the first adhesive length ($\ell 1$), the second adhesive length ($\ell 2$), and the third adhesive length ($\ell 3$). For example, the first adhesive length ($\ell 1$) and the third adhesive length ($\ell 3$) may have the same value.

A part having the first adhesive length ($\ell 1$) may be named "first adhesive part" of the adhesive layer 270, a part having the second adhesive length ($\ell 2$) may be named "second adhesive part" of the adhesive layer 270, and a part having the third adhesive length ($\ell 3$) may be named "third adhesive part" of the adhesive layer 270.

As a result, since the adhesive length of the first plate 101 and the second plate 102 is increased, the adhesive area of the first and second plates 101 and 102 may be relatively increased.

In detail, on the assumption that the first and second plates 101 and 102 are stacked on each other in the vertical direction, the first and third adhesive parts in the horizontal direction, that is, the adhesive parts having the first adhesive length ($\ell 1$) and the third adhesive length ($\ell 3$) are formed. Accordingly, the first plate 101 may be stably supported in the horizontal direction to the second plate 102. In addition, the tensile strength of the plate package may be increased.

In addition, since the second adhesive part in the vertical direction, that is, the adhesive part having the second adhesive length ($\ell 2$) is formed, the first plate 101 may adhesive to the second plate 102 in the vertical direction.

In other words, the second plate 102 may support the first plate 101, and the second to fourth walls 220, 230, and 240 of the second plate 102 may be understood as a "support step" to support the first plate 101. The support step may have a stair shape.

When the distance between the plate body 110 of the first plate 101 and the plate body 110 of the second plate 102 is defined as a flowing depth (D1), the length ($\ell 1+\ell 2+\ell 3$) of the adhesive layer 270 may be formed to be greater than the flowing depth (D1). In other words, since the contact length of the first and second plates 101 and 102 may be increased, the pressure of the fluid flowing through the first and second spaces 170 and 180 may be sufficiently tolerated (pressure resistance of the plate package increased). For example, according to the configuration of the adhesive layer 270 of the present embodiment, the adhesive length may be increased by 20% or more, when comparing with the case that the first and third adhesive parts in the horizontal direction are absent.

To increase the area (hereinafter, referred to a "contact area") in which the flange part 200 of the first and second plates 101 and 102 make contact with each other (adhesive to each other), the angle, that is, bending angle (θ1) formed between the plate body 110 and the first wall 210 may be determined as an appropriate value.

The bending angle (θ1) may be determined according to the thickness (t1) and the flowing depth (D1) of the plate body 110. For example, when the thickness (t1) of the plate body 110 is increased, and the flowing depth (D1) is decreased, the bending angle (θ1) may be increased.

When the thickness (t1) of the plate body 110 is formed to be an excessively great value, the size of the plate type heat exchanger 10 is excessively increased, and the material costs are increased. To the contrary, when the thickness (t1) of the plate body 110 is formed to be an excessively less value, the pressure resistance of the plate package is reduced.

Meanwhile, when the flowing depth (D1) is decreased, the heat exchange efficiency may be improved. However, when the flowing depth (D1) is formed to be an excessively less value, the sizes of the first and second space parts 170 and 180 are significantly reduced, so the flowing performance is degraded, and the manufacturing difficulty is caused.

To solve the above problems and to increase the contact area, the dimensions of the first and second plates 110 and 120 are suggested as follows.

Bending angle (θ1)=90°, and flowing depth (D1)=1.0-2.0 mm,

Thickness (t1) of the plate body 110=0.3-1.0 mm

Hereinafter, a second embodiment of the present disclosure will be described. The present embodiment has a difference than the first embodiment in terms of the configurations of the flange parts of the first and second plates. Accordingly, the following description will be made while focusing on the difference. In addition, the same description and the same reference numerals as those of the first embodiment will be applied to the same part as that of the first embodiment.

Figure 5:
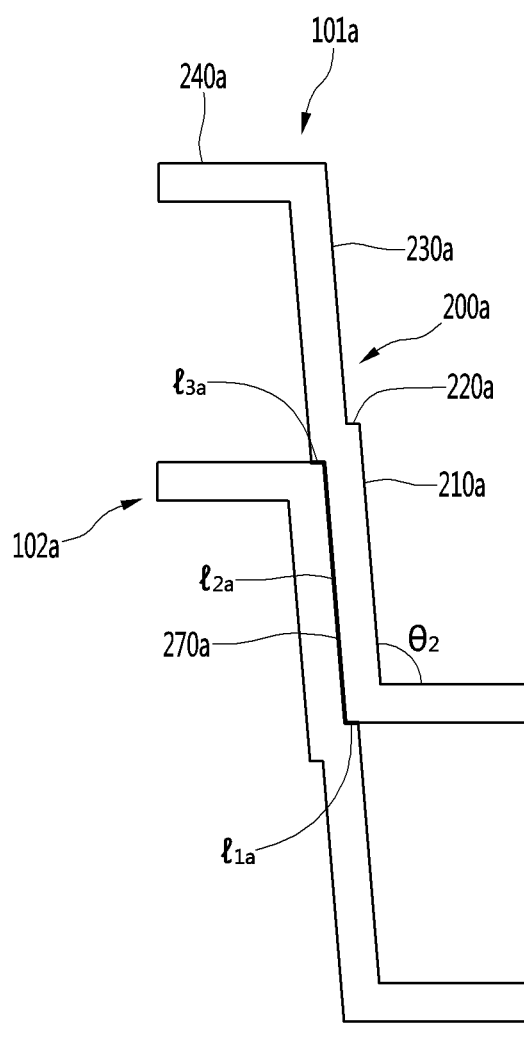
FIG. 5 is a view illustrating a partial configuration of the first and second plates stacked, according to a first embodiment of the present disclosure.

FIG. 5 is a view illustrating a partial configuration of the first and second plates stacked, according to a second embodiment of the present disclosure.

Referring to FIG. 5, the plate type heat exchanger according to the second embodiment of the present disclosure includes a first plate 101a and a second plate 102a stacked on each other in the vertical direction.

The flange part 200a of the first and second plates 101a and 102a has a bent shape, respectively, to form a supporting step to support the adjacent plates, which is the same as the first embodiment. In addition, the flange parts 200a of the first and second plates 101a and 102a may adhere to each other by an adhesive agent. The adhesive layer 270a is interposed between the flange part 200 of the first plate 101a and the flange part 200a of the second plate 102a.

The flange part 200a includes a first wall 210a which is bent from the plate body 110. The first wall 210a may extend from the plate body 110 while forming a second bending angle θ2. For example, the second bending angle θ2 may be formed at 90° or more and 96° or less. The first wall 210a may extend inclined in the vertical direction through the configuration.

The flange part 200a includes a second wall 220a which is bent from the first wall 210a. The second wall 220a may extend in a horizontal direction from the first wall 210a toward the outside of the plate body 110.

The flange part 200a includes a third wall 230a which is bent from the second wall 220a. The third wall 230a may extend in the vertical direction from the second wall 220a. In addition, the direction in which the third wall 230a extends may be parallel to the direction in which the first wall 210 extends.

The flange part 200a includes a fourth wall 240a which is bent from the third wall 230a. The fourth wall 240a may extend in a horizontal direction from the third wall 230a toward the outside of the plate body 110. In addition, the direction in which the fourth wall 240a extends may be parallel to the direction in which the second wall 220a extends.

Through the above configuration, the flange part 200 has a wall bent at least four times from the plate body 110, so the flange part 200 may form a step to support an adjacent heat exchange plate.

In detail, the second wall 220a of the second plate 102a may adhere to the first wall 210a of the first plate 101a, and the third wall 230 of the second plate 102a may adhere to the first wall 210a of the first plate 101a. In addition, the fourth wall 240a of the second plate 102a may make contact with the third wall 230a of the first plate 101a.

The adhesive part between the second wall 220a of the second plate 102a and the first wall 210a of the first plate 101a forms a first adhesive length ($\ell 1$). The adhesive part between the third wall 230a of the second plate 102a and the first wall 210a of the first plate 101a forms a second adhesive length ($\ell 2a$). The adhesive part between the fourth wall 220a of the second plate 102a and the third wall 230a of the first plate 101a forms a third adhesive length ($\ell 3a$).

The adhesive layer 270a between the walls of the first plate 101a and the walls of the second plate 102a has a bent shape, and forms the sum of the first adhesive length ($\ell 1a$), the second adhesive length ($\ell 2a$), and the third adhesive length ($\ell 3a$).

A part having the first adhesive length ($\ell 1a$) may be named "first adhesive part" of the adhesive layer 270a, a part having the second adhesive length ($\ell 2$) may be named "second adhesive part" of the adhesive layer 270a, and a part having the third adhesive length ($\ell 3$) may be named "third adhesive part" of the adhesive layer 270a.

When comparing with the adhesive length described in the first embodiment, according to the present embodiment, the first and second adhesive lengths ($\ell 1a$ and $\ell 3a$) are formed to be smaller than the first and third adhesive lengths ($\ell 1a$ and $\ell 3a$) of the first embodiment. To the contrary, the second adhesive length ($\ell 2a$) may be formed to be longer than the second adhesive length ($\ell 2a$) of the first embodiment.

According to any one of the first and second embodiments, the adhesive length may be more increased as compared with the adhesive structure in which the first and third adhesive parts are absent in the horizontal direction. Accordingly, the adhesive area between the first and second plates 101a and 102a may be more increased.

In particular, according to the present embodiment, since the second adhesive part is formed to extend while being inclined in the vertical direction, the first plate 101a may adhere to the second plate 102a in the vertical direction.

The lengths ($\ell 1+\ell 2+\ell 3$) of the adhesive layer 270 may be formed to be greater than the flowing depth (D1) between the plate body 110 of the first plate 101a and the plate body 110 of the second plate 102a.

According to the present embodiment, the dimensions of the first and second plates 110 and 120 are suggested as follows to increase pressure resistance of the plate package by increasing the contact area between the first and second plates 101a and 102a.

Figure 6:
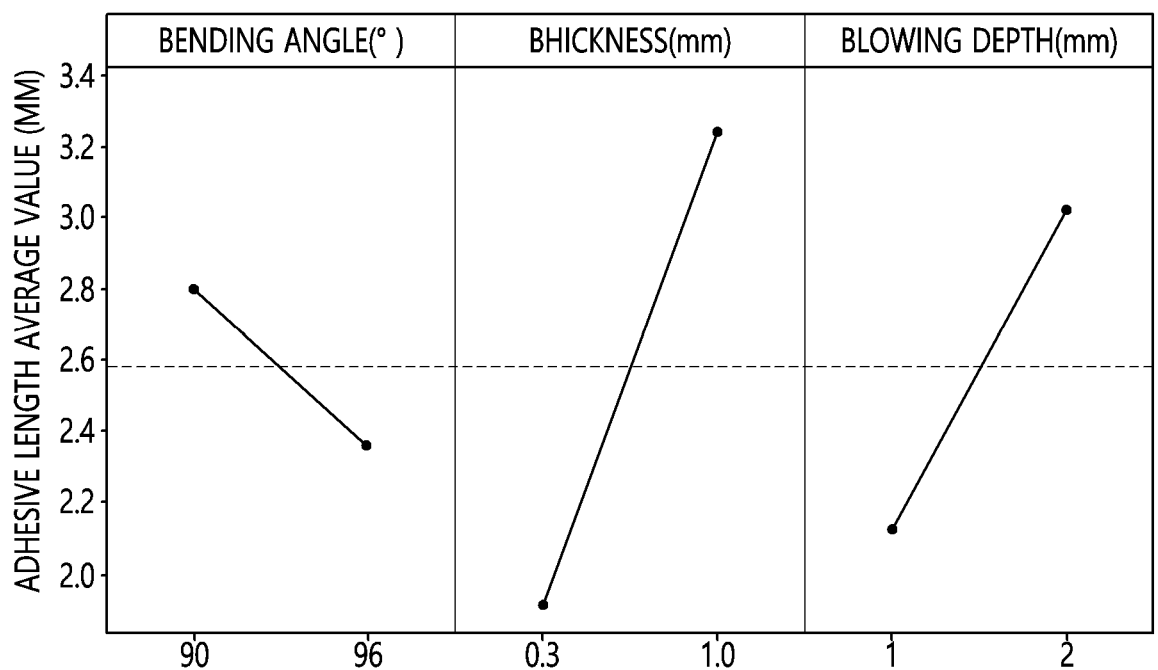
FIG. 6 is an experimental graph illustrating the variation in a contact length between a plurality of plates for each shape factor, with respect to a plate having a bent flange part, according to an embodiment of the present disclosure.
Figure 7:
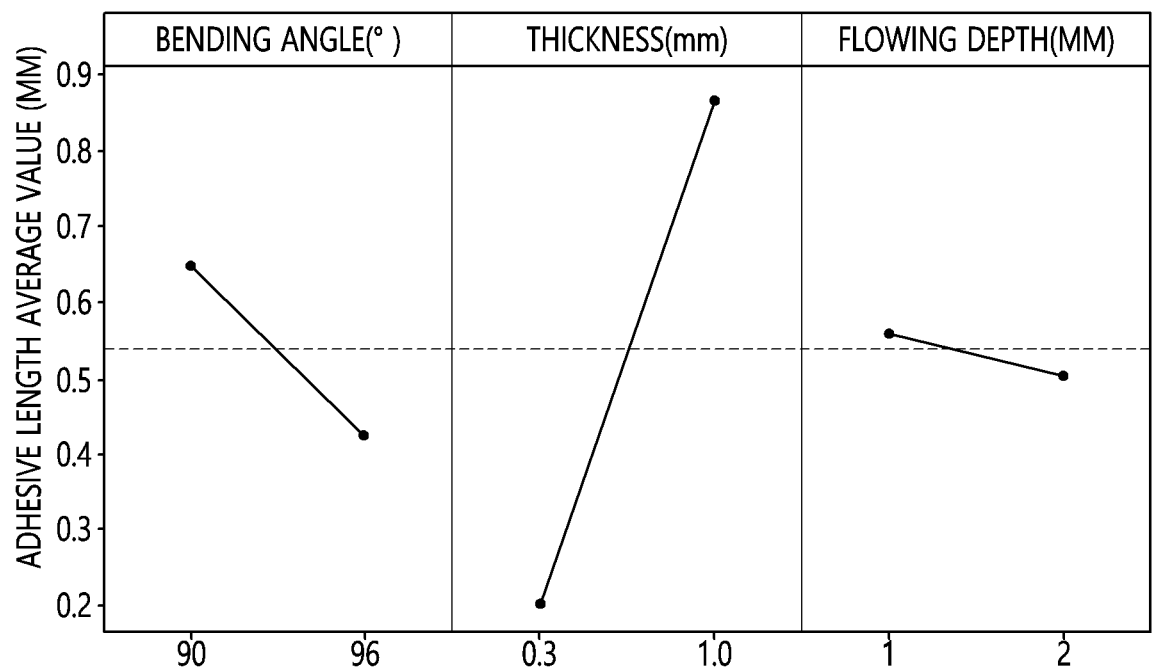
FIG. 7 is an experimental graph illustrating the variation in a longitudinal length between a plurality of plates for each shape factor, with respect to a plate having a bent flange part, according to an embodiment of the present disclosure.

Bending angle ($\theta 2$)=more than 90° and 96° or less, and flowing depth (D1)=1.0 mm to 2.0 mm, Thickness (t1) of the plate body 110=0.3 mm to 1.0 mm FIG. 6 is an experimental graph illustrating the variation in a contact length between a plurality of plates for each shape factor, with respect to a plate having a bent flange part, according to an embodiment of the present disclosure, and FIG. 7 is an experimental graph illustrating the variation in a longitudinal length between a plurality of plates for each shape factor, with respect to a plate having a bent flange part, according to an embodiment of the present disclosure.

To increase the contact area (longitudinal direction or contact length) between the first and second plates, an experiment was performed by varying a factor affecting the contact area, that is, a condition for the thickness (t1) of the plate body 110, the bending angle ($\theta$), and the flowing depth (D1) between the plate bodies 110 of the first and second plates.

TABLE 2

| Classification | Bending angle ($\theta$) | Thickness (t1) mm | Flowing depth (D1) mm | Longitudinal length ($\ell_1$ or $\ell_3$) mm | Contact length ($\ell_1 + \ell_2 + \ell_3$) mm |
|---|---|---|---|---|---|
| First experiment | 90 | 0.3 | 2.0 | 0.3 | 2.60 |
| Second experiment | 96 | 1.0 | 1.0 | 0.8 | 2.60 |
| Third experiment | 90 | 1.0 | 2.0 | 1.0 | 4.00 |
| Fourth experiment | 90 | 0.3 | 1.0 | 0.3 | 1.60 |
| Fifth experiment | 96 | 1.0 | 2.0 | 0.69 | 3.39 |
| Sixth experiment | 96 | 0.3 | 1.0 | 0.17 | 1.34 |
| Seventh experiment | 96 | 0.3 | 2.0 | 0.06 | 2.13 |
| Eighth experiment | 90 | 1.0 | 1.0 | 1.00 | 3.00 |

Figure 8:
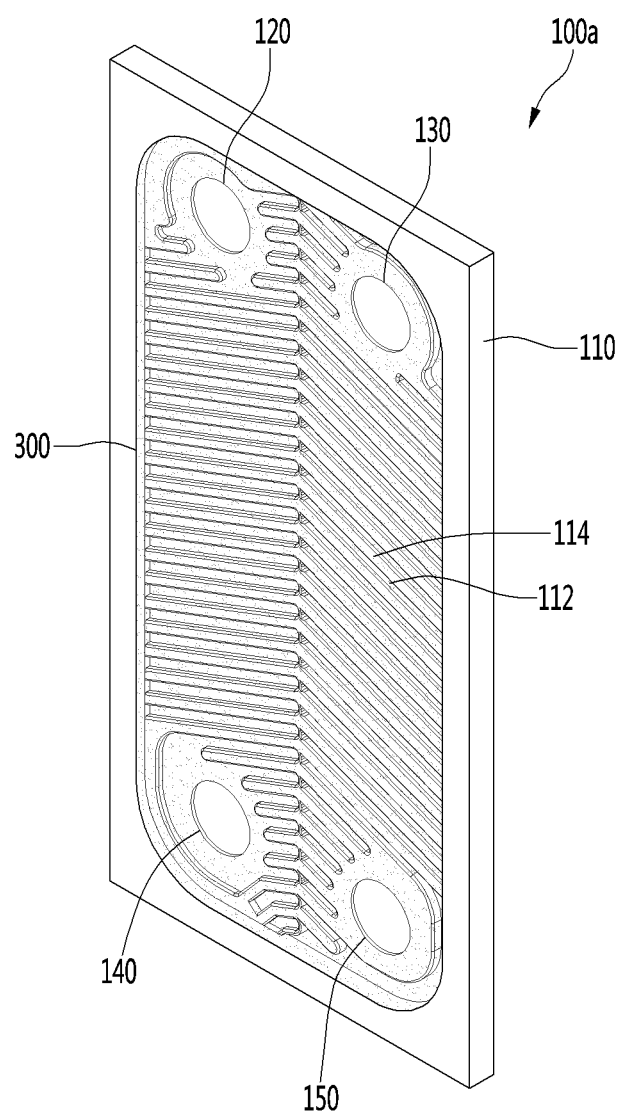
FIG. 8 is a view illustrating the configuration of a heat exchange plate constituting a plate type heat exchanger, according to a third embodiment of the present disclosure.

Referring to table 2 and FIGS. 6 and 7, 8 experiments were performed by forming the bending angle ($\theta$) to have any one of 90° and 96°, the thickness (t1) to be 0.3 mm or 1.0 mm, and the flowing depth (D1) to be in the range of 2.0 mm or 1.0 mm. The horizontal axis illustrated in FIG. 6 represents an average value of the contact lengths ($\ell 1+\ell 2+\ell 3$) varied when varying the combination of the bending angle ($\theta$), the thickness (t1), and the flowing depth (D1). The average value of the contact lengths ($\ell 1+\ell 2+\ell 3$) is formed in the range of 2.4 mm to 2.6 mm.

It may be recognized from the results of the experiment illustrated in FIG. 6 that when the contact length between the first and second plates is the maximum, the factor value, that is, the thickness (t1) of the plate body 110 is 1 mm, the bending angle ($\theta$) is 90° and the flowing depth (D1) between the plate bodies 110 of the first and second plates is 2 mm.

Accordingly, the average value of the contact lengths ($\ell 1+\ell 2+\ell 3$) is formed to be greater than the flowing depth D1.

The vertical axis illustrated in FIG. 7 represents the average value of the varied longitudinal length ($\ell 1$ or $\ell 3$), when the combination of the bending angle ($\theta$), the thickness (t1), and the flowing depth (D1) is varied. The average value of the longitudinal length ($\ell 1$ or $\ell 3$) is formed in the range of 0.4 to 0.65 mm.

It may be recognized from the results of the experiment illustrated in FIG. 7 that, when the contact length between the first and second plates is the maximum, the factor value, that is, the thickness (t1) of the plate body 110 is 1 mm, the bending angle ($\theta$) is 90° and the flowing depth (D1) between the plate bodies 110 of the first and second plates is 1 mm.

As recognized through the above experimental graph, the flange part of the heat exchange plate is structured to be stepped and adheres to the flange part of the heat exchange plate, thereby increasing the adhesive area.

Figure 9:
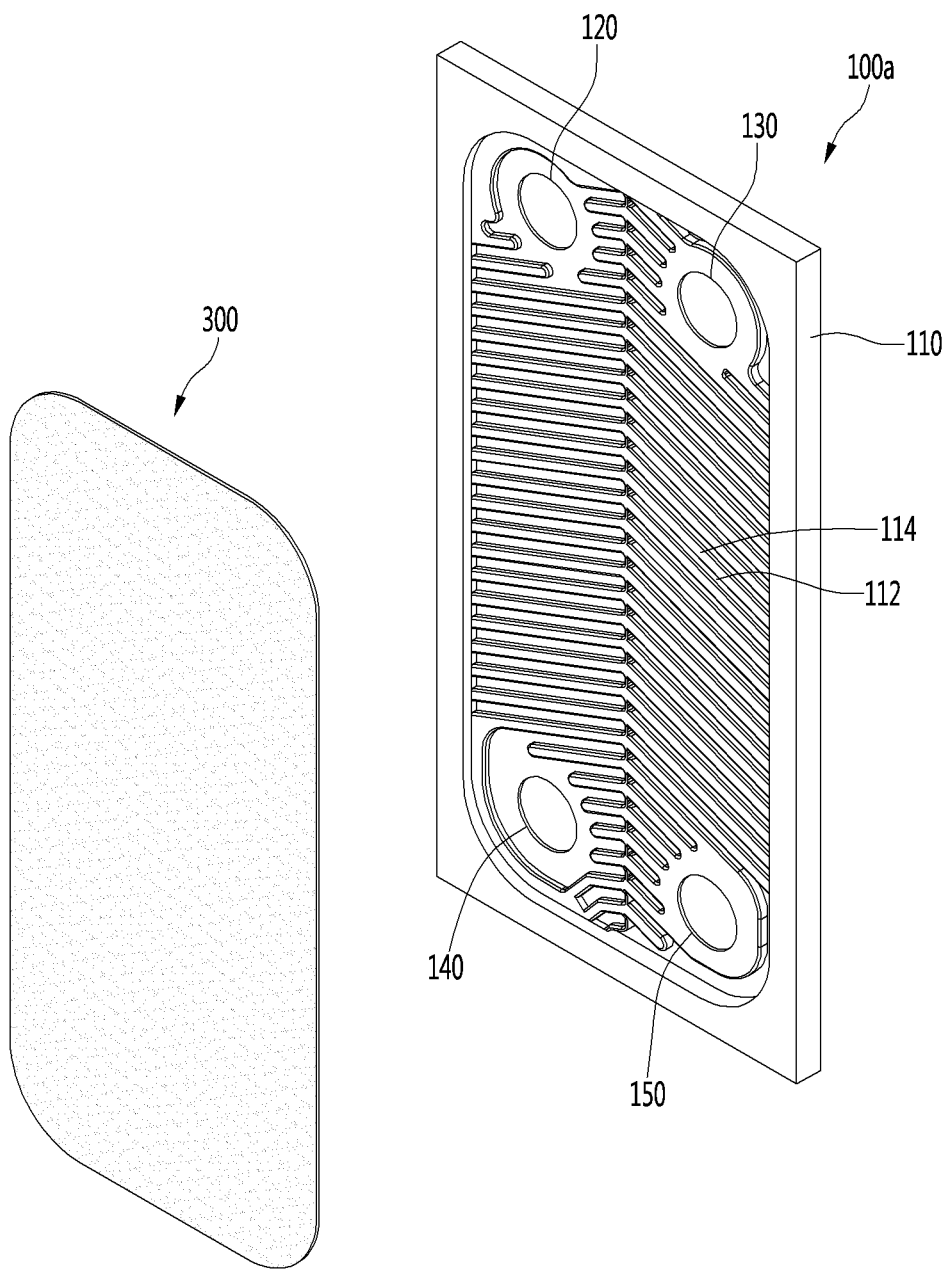
FIG. 9 is an exploded view illustrating the configuration of a heat exchange plate, according to a third embodiment of the present disclosure.

FIG. 8 is a view illustrating the configuration of a heat exchange plate constituting a plate type heat exchanger, according to a third embodiment of the present disclosure, and FIG. 9 is an exploded view illustrating the configuration of a heat exchange plate according to a third embodiment of the present disclosure.

Next, referring to FIGS. 8 and 9, the heat exchange plate 100a according to the embodiment of the present disclosure includes a plate body 110 having a substantially quadrangular panel shape and a plurality of port openings 120, 130, 140, and 150 which are arranged at four corners of the plate body 110 and communicates the first and second inlet/outlet ports 60 and 70 to guide the flow of the fluid.

The plurality of port openings 120, 130, 140, and 150 include first and fourth port openings 120 and 150 formed at positions corresponding to the two first inlet/outlet ports 60. In other words, the first and fourth port openings 120 and 150 may be arranged in a diagonal direction to each other.

The plate body 110 includes an unevenness part formed on the front surface thereof. In detail, the unevenness part includes a protrusion part 112 protruding forward from the front surface of the plate body 110, and a recess part 114 recessed rearward from the front surface of the plate body 110. A plurality of protrusion parts 112 and recess parts 114 may be provided, and may be arranged while alternating with each other. In addition, the plate body 110 may include an unevenness part formed on the rear surface thereof. For example, herringbone patterns may be formed on the front surface and the rear surface of the plate body 110 by the plurality of protrusion parts 112 and the plurality of recess parts 114.

The unevenness part of the plate body 110 may be provided to make contact with an unevenness part provided in another adjacent heat exchange plate 100. In addition, an adhesive part 310 (see FIG. 11) may be interposed between unevenness parts making contact to each other. The adhesive part 310 forms a portion of the adhesive agent 300.

The adhesive agent 300 includes glass frit. In detail, the adhesive agent 300 may include a glass composition (enamel composition) in the form of a paste, and may be dispensed or applied to the entire surface of the plate body 110. For example, the adhesive agent 300 may be applied to the plate body 110 through spraying or dipping in a liquid form having a predetermined viscosity.

In addition, a debinding process is performed with respect to the plate body 110 having the adhesive agent to remove a binder from the adhesive agent 300. The debinding process may be understood as a process of vaporizing the binder by exposing the plate body 110 including the adhesive agent 300 to an environment having a preset temperature.

The adhesive agent 300 may be prepared by mixing a glass composition, glass powder including a binder, and a solvent. The glass composition may include glass frit including $P_2O_5$ and $TiO_2$ and a Group I-based oxide. The detailed description regarding the glass composition uses the description of the first embodiment (refer Table 1).

Figure 10:
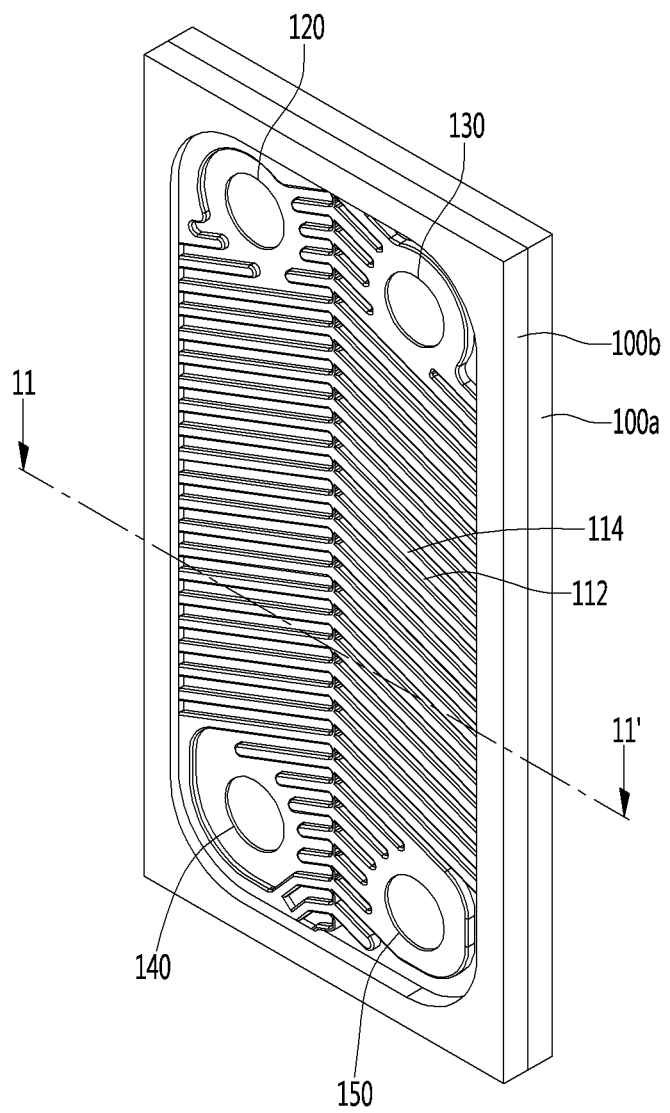
FIG. 10 is a view illustrating two heat exchange plates adhering to each other, according to a third embodiment of the present disclosure.
Figure 11:
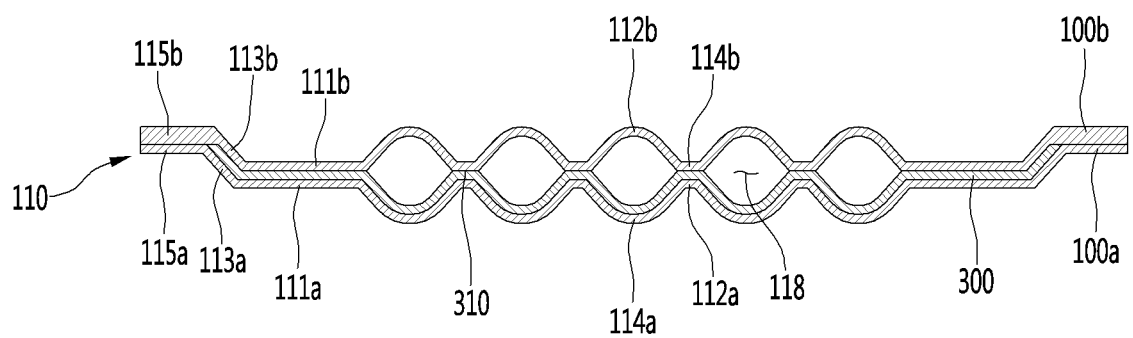
FIG. 11 is a cross-sectional view taken along line 11-11' of FIG. 10.

FIG. 10 is a view illustrating two heat exchange plates adhering to each other, according to a third embodiment of the present disclosure, and FIG. 11 is a cross-sectional view taken along line 11-11' of FIG. 10.

Referring to FIGS. 10 and 11, according to the third embodiment of the present disclosure, a plurality of heat exchange plates 100a and 100b are stacked on each other in a front-rear direction, and adhere to each other by an adhesive agent 300 provided therebetween. For example, FIG. 4 illustrates two heat exchange plates 100a and 100b stacked on each other and coupled to each other. The two heat exchange plates 100a and 100b include a first plate 100a and a second plate 100b coupled to the front surface of the first plate 100a.

An adhesive agent 300 for adhering to the second plate 100b may be provided on the front surface of the first plate 100a. The adhesive agent 300 may be coated on the first plate 100a by spraying the glass composition described above.

Unevenness parts may be included in front and rear surfaces of the first plate 100a and the second plate 100b.

In detail, the first plate 100a includes unevenness parts 112a and 114a in which protrusion and recessed structures are alternately formed. The unevenness parts 112a and 114a include a first protrusion part 112a and a first recessed part 114a. As a plurality of first protrusion parts 112a and a plurality of first recessed parts 114a are alternatively disposed, a herringbone pattern may be formed. The unevenness parts 112b and 114b may be all formed on the front surface and the rear surface of the first plate 100a.

The second plate 100b includes unevenness parts 112b and 114b in which protrusion and recessed structures are alternately formed. The unevenness parts 112b and 114b includes the second protrusion part 112b and the second recess part 114b. As a plurality of second protrusion parts 112b and a plurality of first recessed parts 114b are alternatively disposed, a herringbone pattern may be formed.

The second protrusion part 112b of the second plate 100b may be positioned in front of the first recess part 114a of the first plate 100a.

The second recess part 114b may be positioned in front of the protrusion part 112a of the first plate 100a. In addition, the second recess part 114b may adhere to the first protrusion part 112a. In other words, the second recess part 114b may be provided to make contact with the first protrusion part 112a by the adhesive agent 300.

In summary, the adhesive agent 300 includes the adhesive part 310 to allow the first plate 100a to adhere to the second plate 100b. The adhesive part 310 may be interposed between the second recess part 114b and the first protrusion part 112a. The left and right widths of the adhesive part 310 may be formed to be about 3 mm.

A plurality of adhesive parts 310 may be provided, and may be spaced apart from each other in a left-right direction, by the configuration of the first and second plates 100a and 100b forming a herringbone pattern. The first and second plates 100a and 100b may be firmly coupled to each other by the configuration of the plurality of adhesive parts 310.

The space defined by the second protrusion part 112b, the first recess part 114a, and two opposite adhesive parts 310 forms a flow passage 118 through which the fluid flows.

The plate body 110 of the first plate 100a includes a first flat plane part 111a provided in the form of a flat surface at opposite sides of the unevenness parts 112a and 114a, an inclination part 113a, which extends outward from the first flat plane part 111a to be inclined, and a second flat plane part 115a which extends outward from the inclination part 113a and is provided in the form of a flat surface.

The adhesive agent 300 is provided on the front surface of the first plate 100a. In detail, the adhesive agent 300 may be provided on the first flat part 111a, the inclination part 113a, and the unevenness parts 112a and 114a of the first plate 100a. The adhesive agent 300 may be provided to have a height of about 3 to 5 mm from the front surface of the first plate 100a.

The plate body 110 of the second plate 100b includes a first flat plane part 111b provided in the form of a flat surface at opposite sides of the unevenness parts 112a and 114a, an inclination part 113b, which extends outward from the first flat plane part 111b to be inclined, and a second flat plane part 115b which extends outward from the inclination part 113b and is provided in the form of a flat surface.

The first flat part 111b, the inclination part 113b, and the second flat plane part 115b of the second plate 100b may be arranged at positions of facing the first flat part 111a, the inclination part 113a, and the second flat plane part 115a of the second plate 100a In addition, the first flat plane part 111b and the inclination part 113b of the second plate 100b may be configured to adhere to the first flat plane part 111a and the inclination part 113a of the second plate 100a.

According to this configuration, the adhesive agent 300 is provided in most of the area of the first plate 100a. In addition, since the adhesive agent 300 is provided on the entire surface of the first plate 100a forming the flow passage 118, foreign matters included in a fluid may be prevented from being accumulated on the heat exchange plate 100. Accordingly, the heat exchange plate 100 may be maintained clean, and may be prevented from being broken due to corrosion.

In addition, as an adhesive agent including a glass composition is provided, the adhesive strength, in particular, compressive strength in a front-rear direction may be improved, and pressure resistance may be improved to endure the internal pressure of the plate type heat exchanger.

Figure 12:
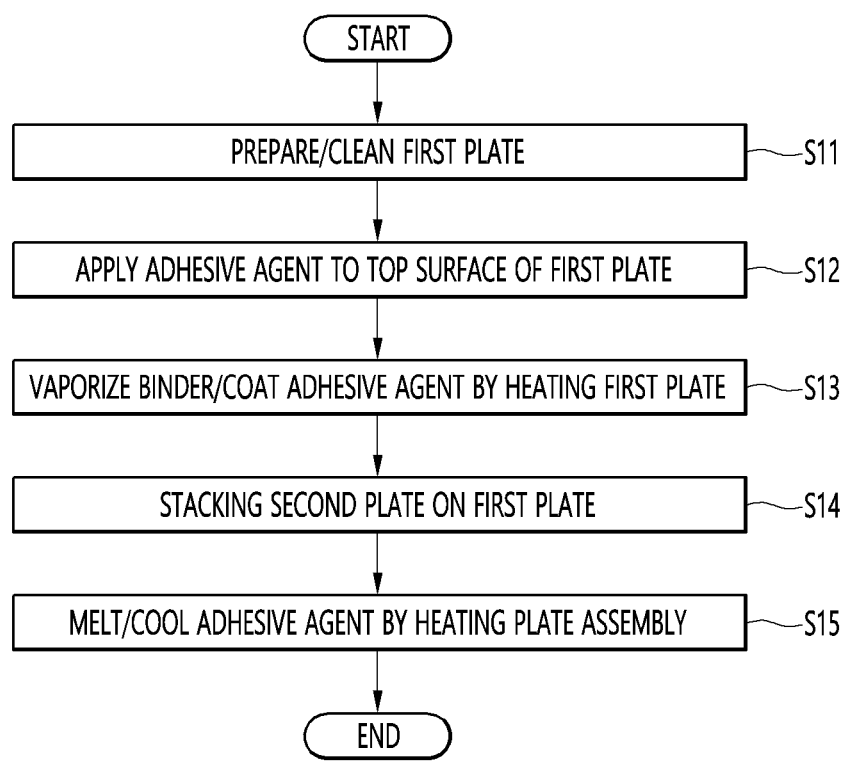
FIG. 12 is a flowchart illustrating a method for manufacturing a plate type heat exchanger, according to a third embodiment of the present disclosure.

FIG. 12 is a flowchart illustrating a method for manufacturing a plate type heat exchanger, according to a third embodiment of the present disclosure.

Referring to FIG. 12, first, a first plate 100a is prepared. The first plate 100a may be provided in a cleaned state (S11).

The adhesive agent 300 is supplied to the first plate 100a. For example, the adhesive agent 300 may be applied to the front surface of the first plate 100a through spraying or dipping (S12).

The first plate 100a is heated. In this process, the binder included in the adhesive 300 may be vaporized. In addition, the adhesive agent 300 may be stably coated on the first plate 100a (S13).

The second plate 100b may be stacked on the first plate 100a. In this process, the second plate 100b may make contact with the adhesive agent 300 provided on the first plate 100a. The assembly of the first and second plates 100a may be referred to as a "plate assembly" (S14).

The plate assembly may be heated. When the plate assembly is heated, the adhesive agent 300 may be melted and the plate assembly may be bonded. In addition, when the plate assembly is cooled, the first and second plates 100a and 100b may firmly adhere to each other. The combination of the plate assemblies may be realized with reliability through the above simple manufacturing method (S15).

In addition, the above-described process is performed with respect to the coupled plate assembly in step S12 to S15, so an additional plate may adhere. The plate package including a plurality of heat exchange plates may be manufactured by repeating the above processes.

Another embodiment is proposed

The plate package may be manufactured at once by stacking a plurality of heat exchange plates at once and melting and cooling the adhesive provided in each heat exchange plate.

INDUSTRIAL APPLICABILITY

According to an embodiment of the present disclosure, since there may be produced the effect of lowering the manufacturing costs and reducing the manufacturing time by combining the heat exchange plates using the adhesive agent, the industrial applicability is remarkable.

The invention claimed is:

1. A plate type heat exchanger, comprising:
first and second plates stacked on each other in a vertical direction to form a space portion to allow a fluid to flow; and
an adhesive layer interposed between the first and second plates and formed by an adhesive agent, wherein the first plate and the second plate each includes:
a plate body having a port opening to allow the fluid to flow in or flow out; and
a flange portion configured to define an edge portion of the plate body and having a shape bent at least two times, wherein the plate body includes a plurality of uneven portions in which a plurality of protrusion portions and a plurality recessed portions are alternately arranged, wherein the adhesive layer includes:
first and third adhesive portions interposed between the flange portion of the first and second plates configured to extend in a horizontal direction; and
a second adhesive portion configured to extend in the vertical direction toward the third adhesive portion from the first adhesive portion, wherein the adhesive agent is provided on an entire surface of the first plate including an entire surface of the plurality protrusion portions of the first plate and an entire surface of the plurality recessed portions of the first plate, wherein the plurality protrusion portions of the first plate and the plurality recessed portions of the second plate are adhered by the adhesive agent to form a flow passage, wherein the flange portion is bent from the plate body fourth times and extends therefrom, wherein the flange portion includes:
a first wall bent from the plate body and extending in the vertical direction;
a second wall bent from the first wall;
a third wall bent from the second wall, and configured to extend parallel to the direction in which the first wall extends; and
a fourth wall bent from the third wall, configured to extend parallel to a direction in which the second wall extends, and configured to be supported by the second wall of the other of the first plate or the second plate, and wherein the direction in which the second and fourth wall extend is toward the outside of the plate body.

2. The plate type heat exchange of claim 1, wherein the first adhesive portion is formed between the first wall of the first plate and the second wall of the second plate.

3. The plate type heat exchange of claim 2, wherein the second adhesive portion is formed between the first wall of the first plate and the third wall of the second plate.

4. The plate type heat exchange of claim 2, wherein the third adhesive portion is formed between the third wall of the first plate and the fourth wall of the second plate.

5. The plate type heat exchange of claim 1, wherein, with respect to a flowing depth indicating a distance between the plate body of the first plate and the plate body of the second plate, a sum of adhesive lengths of the first, second, and third adhesive portions is greater than the flowing depth.

6. The plate type heat exchange of claim 5, wherein a bending angle between the plate body and the first wall is 90° or more and 96° or less.

7. The plate type heat exchange of claim 5, wherein a thickness of a plate body is formed in a range of 0.3 mm to 1.0 mm, and the flowing depth is in a range of 1.0 mm to 2.0 mm.

8. The plate type heat exchange of claim 1, wherein the adhesive agent includes glass frit including $P_2O_5$ and $TiO_2$ and a Group I-based oxide.

9. The plate type heat exchange of claim 8, wherein the $P_2O_5$ is contained in 20% to 30% by weight based on the whole glass frit, wherein the $TiO_2$ is contained in 10% to 20% by weight based on the whole glass frit, and wherein the Group I-based oxide is contained in 15% to 30% by weight based on the whole glass frit.

10. The plate type heat exchange of claim 9, wherein the Group I-based oxide includes at least one of $Na_2O$, $K_2O$, and $Li_2O$.

11. The plate type heat exchange of claim 9, wherein the glass frit further includes $SiO_2$, and wherein the $SiO_2$ is contained in 10% to 20% by weight based on the whole glass frit.

12. The plate type heat exchange of claim 9, wherein the glass frit further includes $B_2O_3$, and wherein the $B_2O_3$ is contained in 5% to 15% by weight based on the whole glass frit.

13. The plate type heat exchange of claim 9, wherein the glass frit further includes $Al_2O_3$, and wherein the $Al_2O_3$, is contained in 10% to 30% by weight based on the whole glass frit.

14. The plate type heat exchange of claim 9, wherein the glass frit further includes a fluorine (F) compound, wherein the fluorine compound includes at least one metal oxide of NaF and $AlF_3$, and wherein the fluorine compound is contained in 0.1% to 5% by weight based on the whole glass frit.

15. The plate type heat exchange of claim 9, wherein the glass frit further includes $ZrO_2$, and wherein the $ZrO_2$ is contained in 1% to 5% by weight based on the whole glass frit.

16. The plate type heat exchange of claim 9, wherein the glass frit further includes a Group II-oxide, wherein the Group II-oxide includes at least one metal oxide of CaO, MgO, and BaO, and wherein the Group II-based oxide is contained in 0.1% to 10% by weight based on the whole glass frit.

17. The plate type heat exchanger of claim 1, wherein the second and fourth wall extend in the horizontal direction.

18. The plate type heat exchange of claim 1, further including a third plate stacked in a vertical direction with the first and second plates to form a space portion to allow a fluid to flow, wherein the third plate includes:

the plate body having the port opening to allow the fluid to flow in or flow out; and the plurality of protrusion portions and the plurality of recessed portions formed at the plate body and alternately arranged, wherein the plurality of recessed portions of the second plate is in contact with the plurality of protrusion portions of the third plate to form a plurality of the space portion between the second and third plates.

\* \* \* \* \*